UNITED STATES PATENT OFFICE.

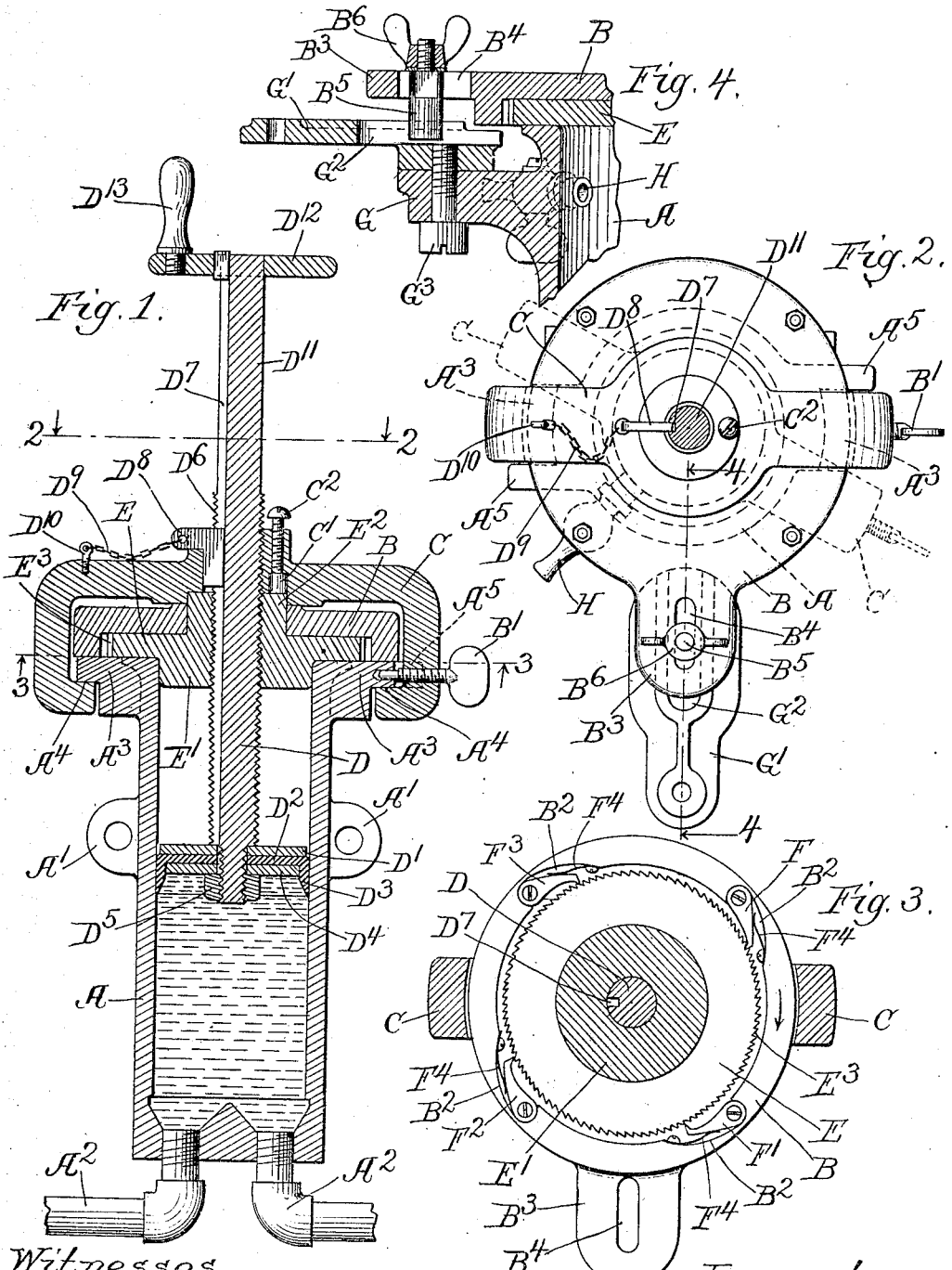

CHARLES F. SCHROYER, OF CHICAGO, ILLINOIS.

LUBRICATOR.

No. 852,039.   Specification of Letters Patent.   Patented April 30, 1907.

Application filed December 11, 1905. Serial No. 291,168.

*To all whom it may concern:*

Be it known that I, CHARLES F. SCHROYER, a citizen of the United States, residing at Chicago, in the county of Cook and State of Illinois, have invented a certain new and useful Improvement in Lubricators, of which the following is a specification.

My invention relates to lubricators and particularly to the type known as force feed lubricators adapted to be operated by connection with some moving part of the machine on which they are used.

The invention consists generally of an oil cylinder with a plunger to act upon the oil in the cylinder and force it therefrom, and a driving mechanism for advancing the plunger. It is highly important particularly when the driving mechanism is actuated from a rapidly moving part of the engine, which will very frequently be the case, that there should be a very great reduction of speed between the moving part of the engine and the plunger. If the plunger is to be advanced continuously its speed must be almost imperceptibly slow, while if the lubricator is to be operated from an oscillating part the intermediate driving mechanism must be capable of moving the plunger by almost infinitesimal advances. In this application I have shown a form of driving mechanism particularly suitable to this purpose, and which consists generally of a threaded plunger rod, a rotating disk and a peculiar form of compound ratchet device, as it may be termed.

The invention is illustrated in the accompanying drawings, wherein

Figure 1 is a vertical section, Fig. 2, a section taken on line 2—2 of Fig. 1, and showing the top of the oil cylinder in plan; Fig. 3, a sectional view on line 3—3 of Fig. 1 and Fig. 4, a detail vertical section on line 4—4 of Fig. 2.

Like letters of reference indicate like parts in all the drawings.

A represents the oil cylinder which may be provided with the lugs $A^1$ $A^1$ for suitably securing it in place in the machine on which it is used.

$A^2$ $A^2$ represent oil ways which lead from the bottom of the cylinder and which, of course, may be multiplied to any desired extent.

Over the top of the cylinder is the dish shaped cover or flanged disk B which rests upon lugs $A^3$ $A^3$ on the cylinder, these lugs being cut away to form shoulders $A^4$ $A^4$ which are engaged by the inturned ends of a yoke C extending across the top of the cylinder and affording a bearing for the cover B. The lugs $A^3$ are provided with stops $A^5$ $A^5$ and the yoke has a thumb screw $B^1$ which takes into one of the lugs $A^3$ so as to hold the yoke in position.

The cover B and the yoke C are apertured centrally and through this aperture extends the plunger rod D carrying a plunger consisting of a metal disk $D^1$, a disk of packing $D^2$ with its edges turned over as shown at $D^3$ and a washer $D^4$, these parts being secured to the end of the plunger rod by means of a nut $D^5$. The plunger rod D is screw threaded through the greater part of its length as shown at $D^6$, the threaded portion being engaged by a rotating disk E located between the cover B and the flange of the oil cylinder. This disk preferably has the lower hub $E^1$ fitting snugly into the upper end of the oil cylinder and the upper hub $E^2$ extending through the cover B and bearing against the recessed center part of the yoke C. This provides for an accurate centering of the plunger and gives a strong bearing for the rotating disk against the upward thrust of the plunger rod. To prevent rotation of the plunger rod with the disk, the rod is provided with a longitudinal groove $D^7$ into which extends a removable key $D^8$ which for convenience may be secured to the yoke by the chain $D^9$ and fastened to the eye screw $D^{10}$. To prevent rotation of the disk E by the back movement of cover B I provide in the yoke a fiber plug $C^1$ adjustably held against the upper face of the hub $E^2$ by means of a screw $C^2$. This plug serves as a brake.

The form of apparatus herein described is particularly adapted to be actuated from some oscillating part of the machine on which the lubricator is used. I therefore drive the disk E intermittently through very short arcs. The apparatus which I have designed to accomplish this, consists of a number of pawls acting upon a ratchet $E^3$ formed on the perimeter of the wheel. I have shown four of these pawls indicated respectively by the letters F, $F^1$, $F^2$ and $F^3$, the pawls being pivoted in recesses $B^2$ in the under side of the cover B and held against the ratchet by means of the springs $F^4$. On the cover B is a lug $B^3$ having the slot $B^4$ through which extends the pin $B^5$ which is held adjustably in the slot by the wing nut $B^6$.

The cylinder A is formed with a lug or bracket G to which is pivoted an oscillating arm $G^1$ provided with a slot $G^2$. As here shown the screw $G^3$ serves as a pivot for the part $G^1$. The pin $B^5$ projects into the slot $G^2$. The arm $G^1$ is designed to be connected in any desired manner not here shown, with some moving part of the engine so that it is given a reciprocating movement. With each oscillation of the arm $G^1$ the cover B will be given a partial rotation one way or the other and the amplitude of this movement may be varied from zero to a certain maximum by setting the pin $B^5$ at different positions in the slot. By moving the pin over the pivot $G^3$ of the oscillating arm the operation of the lubricator may be stopped without disconnecting any of the parts.

The arrangement of the pawls F, $F^1$, etc., deserves particular attention for by this arrangement I am able to get a very slow feed when necessary. It would not be practical to make the teeth of the ratchet $E^3$ small enough to provide the minimum oil feed which may under certain circumstances be desired, and to meet this difficulty I have devised the use of a number of pawls which act successively to move the disk a fraction of the distance measured by one tooth. This is clearly shown in Fig. 3. Here the pawl F, supposing the cover B to be at the beginning of its forward oscillation, is ready to act upon the ratchet. If the arc measuring the rotation of the cover B is equivalent to a single notch of the ratchet E or is a multiple of that distance, the pawl F alone will accomplish the work, the other pawls remaining idle. If, however, the speed of the oil feed is to be so reduced that the cover must rotate a distance measured by a fraction only of a notch, then one or other of the pawls will come into play with the second oscillation of the arm $G^1$. It will be seen, therefore, that by a proper adjustment of the pin $B^5$, the rotation of the disk $E^3$ may be reduced to that fractional part of a single tooth indicated by the number of pawls with which the device is supplied. In the apparatus shown in the drawings, the minimum rotation of the disk is fixed at one-fourth of a tooth. As will be seen by inspection of Fig. 3, the pawls are so located as to come into play in the order indicated by their exponent reference letters, supposing that the intermittent rotation of the disk is measured by an arc equivalent to one-fourth of a tooth. With the second oscillation of $G^1$ pawl $F^1$ will fall behind the tooth on which it rests in the position shown in Fig. 3, with the third oscillation pawl $F^2$ will come into place and with the fourth, pawl $F^3$. It is, of course, obvious that these pawls might be multiplied to any extent, this being a matter depending upon the minimum feed desired and upon convenience in the mechanical construction.

I have found some difficulty in the use of devices of this character in the insertion and removal of the plunger when the cylinder is filled. In replacing the plunger after oil has been put into the cylinder, a certain amount of air is caught between the cylinder and the plunger which it is difficult to get rid of. In order to minimize this difficulty, I have provided the upper part of the cylinder with a cock H. The oil is poured into the top of the cylinder so as to come as near as possible to the level of the cock which is opened when the plunger is inserted. In removing the plunger the cock is also opened so as to break the vacuum above the plunger. In order to automatically throw the machine out of operation when the plunger has reached the bottom of the cylinder the upper part of the rod D is left smooth as shown at $D^{11}$. The upper end of the rod may be provided with a wheel $D^{12}$ having the hand grip $D^{13}$ so that by removing the key $D^8$ the plunger may be screwed down by hand.

The use and operation of my invention are as follows: To fill the device, the thumb screw $B^1$ is unscrewed, which permits the yoke to be turned free of the lugs. The yoke, together with the plunger, the disk and the cover, may then be removed from the cylinder, the cock H being preferably open so as to break the vacuum which has been formed above the plunger. The oil is then poured into the top of the cylinder, the plunger replaced and screwed down upon the oil which is conveniently done by means of the handle $D^{13}$, the cock H remaining open so as to allow as much of the air above the oil to escape as is possible. The oscillating lever $G^1$ is connected with some part of the machine as, for example, with the eccentric, and when it is desired to start the oil, the pin $B^5$ is moved outward a proper distance from the center of oscillation of $G^1$.

The oil used for the lubrication of machines is a more or less stiff viscous liquid often running hard, particularly in cold weather. My invention which involves the application of force to a considerable mass of oil insures uniform feed. The upward thrust of the operating disk will, of course, be considerable and this is taken care of by means of the yoke C.

I claim:

1. In a lubricator, the combination of an oil cylinder with a plunger having a threaded stem, a disk at the top of the cylinder having a central threaded aperture to receive the threaded stem, a dish-shaped member extending over and engaging with the disk whereby the movement of the former is imparted to the latter, and an oscillating driving member, such member and the dish-shaped member adjustably connected one to the other so as to vary the amplitude of motion of the dish-shaped member.

2. In a lubricator, the combination of an oil cylinder with a plunger having a threaded stem, a disk at the top of the cylinder having a central threaded aperture to receive the threaded stem, a dish-shaped member extending over and engaging with the disk whereby the movement of the former is imparted to the latter, and an oscillating driving member, said member and the dish-shaped member constantly and adjustably connected so as to vary the amplitude of motion of the dish-shaped member.

3. In a lubricator, the combination of an oil cylinder with a plunger having a threaded stem, a disk with a central threaded aperture to receive the threaded stem of the plunger, means for rotating the plunger, and a brake consisting of a plunger of soft material bearing upon the rotating part.

4. In a lubricator, the combination of an oil cylinder with a plunger having a threaded stem, a disk at the top of the cylinder having a central threaded aperture to receive the threaded stem, an oscillating member extending over said disk, connections between said oscillating member and the disk whereby the movement of the former is imparted to the latter, means for oscillating said oscillating member, and a removable yoke engaging with the oil cylinder and extending over said oscillating member and disk so as to form a bearing therefor.

5. In a lubricator, the combination of an oil cylinder with a plunger having a screw threaded stem, a pair of driving disks surrounding said stem, and a driving device, one of the disks being a ratchet-disk and screw threaded to engage with the stem, and the other connected with the driving device, and having pawls to engage with the teeth of the ratchet disk.

6. In a lubricator, the combination of an oil cylinder with a plunger having a threaded stem, a ratchet disk at the top of the cylinder having a central threaded aperture to receive the threaded stem, an oscillating device extending over said disk, a series of pawls on the inside of said oscillating device and arranged so as to engage successively with the teeth of the ratchet disk, and means for oscillating said oscillating device.

7. In a lubricator, the combination of an oil cylinder with a plunger having a threaded stem, a disk with a central threaded aperture to receive the threaded stem of the plunger, a yoke in engagement with the oil cylinder and extending over the disk and forming a bearing therefor, a brake consisting of a plug of soft material associated with said yoke and bearing upon the disk, and means for intermittently rotating said disk.

8. In a lubricator, the combination of an oil cylinder with a plunger having a threaded stem, a disk at the top of the cylinder having a central threaded aperture to receive the threaded stem, an oscillating device engaging with the disk whereby the movement of the former is imparted to the latter, a pivoted arm on the outside of the oil cylinder, and means for engaging said oscillating device with said arm at different distances from the pivotal point of the arm.

9. In a lubricator, the combination of an oil cylinder with a plunger having a threaded stem, a disk at the top of the cylinder having a central threaded aperture to receive the threaded stem, an oscillating device engaging with the disk whereby the movement of the former is imparted to the latter, a pivoted slotted arm on the outside of the oil cylinder, said oscillating device provided with a slot, and a set pin adapted to be set so as to engage with the slots of the oscillating device and of said pivoted arm at a variety of positions.

10. In a lubricator, the combination of an oil cylinder with a plunger having a screw threaded stem, a pair of driving disks surrounding said stem, one cup-shaped and inclosing the other, and a driving device, one of the disks screw threaded and engaging with the stem, and the other connected with the driving device, and connecting devices between the disks.

11. In a lubricator, the combination of an oil cylinder with a plunger having a screw threaded stem, a ratchet disk at the top of the cylinder with a hub extending therein, a cover mounted so as to oscillate over said disk, a series of pawls on the interior of said cover adapted to engage in succession with the teeth of the ratchet disk, a removable yoke engaging with the oil cylinder and extending over said disk and cover and forming a bearing therefor, a pivoted arm on the outside of said oil cylinder, and means for engaging the cover with said arm at different distances from its pivot.

12. In a lubricator, the combination of an oil cylinder with a plunger having a screw threaded stem, a pair of driving disks surrounding said stem, and a driving device, one of said disks screw threaded to engage the stem, and provided with an inwardly projecting hub to close the upper part of the oil cylinder and serve as a bearing, and the other connected with the driving device, and connecting devices between the disks.

13. In a lubricator, the combinaton of an oil cylinder with a plunger having a screw threaded stem, a pair of driving disks surrounding said stem, and a driving device, the inner disk having two hubs one entering the oil cylinder to close the same and serving as a bearing, the other adapted to serve as a bearing for the outer disk, a connection between the outer disk and the driving device, and a connecting device between the two disks.

14. In a lubricator, the combination of an oil cylinder, with a plunger having a stem, a rotatable driving disk connected with the stem to advance the plunger, an oscillating device in contact with the rotating disk, connections between the disk and the oscillating device whereby the disk is rotated with the forward oscillation of the oscillating device, and a brake comprising a body of material bearing upon the disk to keep the disk from being rotated back with the backward oscillations of the oscillating device.

15. In a lubricator, the combination of an oil cylinder with a plunger having a stem, a rotatable driving disk connected with the stem, a second disk mounted on the rotatable disk, means for imparting oscillating movement to the second disk, connections between the second disk and the first disk whereby the first disk is rotated with the forward oscillations of the second disk, and a brake consisting of a body of material bearing upon the first disk to keep the same from being rotated back with the backward oscillations of the second disk.

16. In a lubricator, the combination of an oil cylinder, with a plunger therein, a ratchet disk engaging with the plunger so as to advance the same in the cylinder, an oscillating device, means for imparting oscillating motion to the same, and means for rotating the ratchet disk from the oscillating device through arcs less than the distance between its teeth comprising a series of pawls mounted upon the oscillating device at distances different from the distances between the teeth of the ratchet disk.

CHARLES F. SCHROYER.

Witnesses:
HOMER L. KROFT,
PERCIVAL W. TRUMAN.